July 24, 1934.  J. R. PUTNAM  1,967,782
SUBSYNCHRONOUS ELECTRIC MOTOR
Filed April 20, 1932
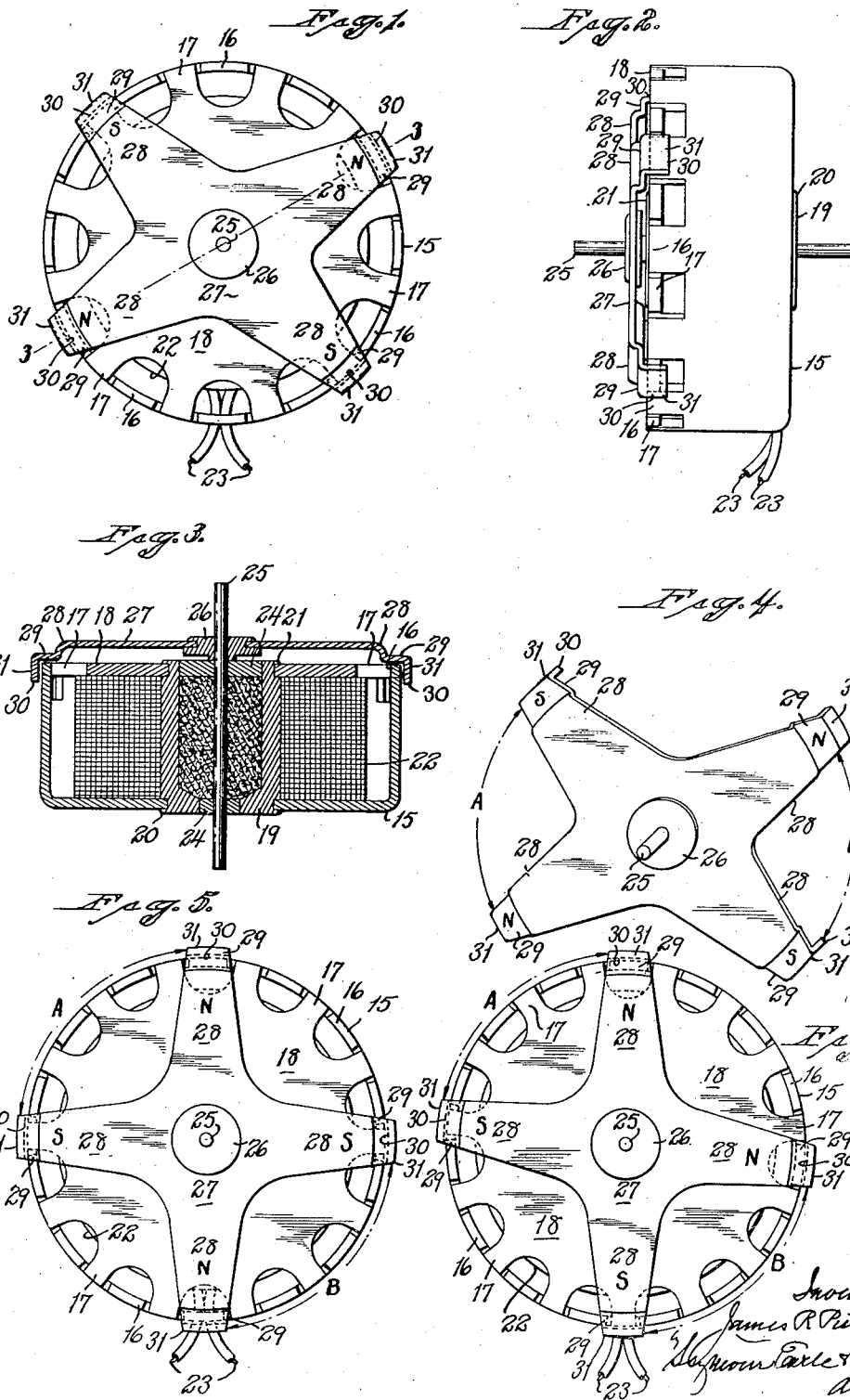

Patented July 24, 1934

1,967,782

UNITED STATES PATENT OFFICE 1,967,782

SUBSYNCHRONOUS ELECTRIC MOTOR

James R. Putnam, Waterbury, Conn., assignor, by mesne assignments, to Arthur William Haydon, Waterbury, Conn.

Application April 20, 1932, Serial No. 606,312

4 Claims. (Cl. 172—275)

This invention relates to an improvement in sub-synchronous electric motors, that is to say, motors the speed of which, under normal running conditions, is in exact proportion to the number of cycles of alternations in the current-supply but less than a speed corresponding to the number of such cycles in a given period of time.

One of the main objects of my present invention is to provide, at a relatively low cost for manufacture, a compact electric motor having synchronous characteristics but operating at sub-synchronous speeds and characterized by simplicity of construction combined with maximum torque in operation.

Heretofore, in synchronous motor structures, it has been the general practice to enclose, so to speak, the rotor within a stator-structure, or to place the stator-structure axially in line with the rotor in such manner that the polar-projections of the stator act upon the face of the rotor. In one of its aspects, as will be seen from the following, my present invention comprehends the arrangement of the stator-structure and rotor, so that the polar-projections of the stator are enclosed, so to speak, within the sweep of the operating-portions of the rotor located radially and exteriorly thereto, whereby markedly increased torque results without materially sacrificing over-all compactness of the motor-structure.

With the above and other objects in view as will appear from the following, my invention consists in a sub-synchronous electric motor having certain features of construction and combinations and arrangements of parts as will be hereinafter described and particularly recited in the claims.

In the accompanying drawing:

Fig. 1 is a face view of one form which a sub-synchronous electric motor constructed in accordance with my invention may assume;

Fig. 2 is an edge view thereof;

Fig. 3 is a transverse sectional view taken on the line 3—3 of Fig. 1;

Fig. 4 is a perspective view of the rotor of the form of motor shown in the preceding figures, Fig. 5 is a face view of a sub-synchronous electric motor substantially corresponding to that shown in the preceding figures but embodying certain modifications in the arrangement of parts; and Fig. 6 is a similar view of still another form which a sub-synchronous electric motor embodying my invention may assume.

The particular sub-synchronous electric motor herein chosen for the illustration in Figs. 1 to 6 inclusive consists in the main of a cup-shaped sheet-metal stator-member 15 having the outer edge of its flange notched at regularly spaced intervals to divide the same into an annular series of polar-projections 16, between which extend in equidistant spaced relationship an annular series of polar-projections 17 radially projecting from the edge of a disk-like stator-member 18.

The disk-like stator-member 18 is secured to the cup-shaped stator-member 15 by means of an axially-arranged tubular core-piece 19 which is suitably shouldered at each of its respective opposite ends and riveted over as at 20 upon the outer face of the bottom wall of the stator-member 15 and similarly riveted as at 21 over the outer face of the stator-member 18. Located within the stator-member 15 and interposed between the bottom wall thereof and the inner face of the stator-member 18 is a stator-coil or solenoid 22 having the usual terminals 23—23 providing for its connection to a source of alternating current.

The respective stator-members 15 and 18 and the core-piece 19 are preferably formed of soft iron or other magnetic material, so as to have capacity for a substantially instantaneous change of magnetic polarity under the influence of an alternating current flowing through the coil 22.

The tubular core-piece 19 has installed in each of its respective opposite ends a perforated bearing-disk or washer 24 preferably formed of an anti-friction material, such as bronze. The respective disks 24—24 serve as bearings for a rotor-shaft 25 extending axially through the core-piece 19 and rigidly mounting a hub 26 upon which, in turn, is rigidly mounted a rotor 27 formed, in the present instance, of permanent magnet material, such as hardened steel.

The rotor 27 just above referred to is formed with a plurality of substantially-radial arms 28, each of which has its outer end inwardly offset as at 29 and inwardly bent at a right angle to form a finger 30 spaced slightly away from and extending substantially-parallel with the polar-projections 16 of the stator-member 15. The inwardly-offset portion 29 and the finger 30 of each of the said arms 28 of the stator-member may be together regarded as a unitary polar-projection 31 cooperating with the polar-projections 16 and 17 respectively of the stator-members 15 and 18.

It will be observed that the inner face of the inwardly-offset portion 29 of each of the arms 28 is sufficiently close to the outer face of the polar-projections 17 of the member 18 and the upper edges of the polar-projections 16 of the member 15 to be magnetically influenced thereby. Similarly, the finger 30 of each of the respective arms 28 extends into close proximity to the periphery of both the stator-members 15 and 18, so as to be influenced by the respective polar-projections 16 and 17 thereof.

By providing the rotor 27 with a plurality of inwardly-turned fingers 30 operating adjacent the periphery of the stator-structure, the polar-projections (both 16 and 17) of the latter may be said to be enclosed within the sweep of the operating-portions of the said rotor.

For the purpose of making clear certain novel features of the improved sub-synchronous motor herein chosen for the illustration of certain aspects of my invention in Figs. 1 to 6 inclusive, the rotor 27 may be regarded as having two (or more) pairs of polar-projections 31 respectively designated A and B. Prior to its assembly with the stator, the rotor is permanently magnetized in such manner that each of the said pairs of polar-projections includes one polar-projection of a south magnetic polarity and a complementary polar-projection of opposite or north magnetic polarity. Furthermore, each polar-projection of a given pair thereof is so spaced with respect to its complementary polar-projection and with respect to the polar-projections of the stator-structure that in any given position of the rotor, one polar-projection of a given pair is in substantial alignment with one of the polar-projections 17 of the stator-member 18, while the complementary polar-projection of the said pair is in substantial alignment with one of the polar-projections 16 of the stator-member 15.

The characterization of each pair of polar-projections of the rotor as just above given applies with equal force to the three different forms of motor shown in Figs. 1 to 6 inclusive of the accompanying drawing.

In the particular motor design shown in Figs. 1 to 4 inclusive (showing a 300 R. P. M. motor when operating on 60-cycle current), the respective polar-projections of a given pair may be characterized as being adjacent, since the space between them is of less extent than the space between them and the polar-projections of the opposite pair. The rotor just described is a preferred form and it will be noted by reference to Fig. 4 in particular that the polar-projection of south polarity of the pair A is substantially diametrically-opposite the polar-projection of south polarity of the pair B. The respective polar-projections of north polarity of the respective pairs are similarly substantially diametrically-opposite each other. By the arrangement of poles of the rotors just described, the respective polar-projections thereof retain their polarity almost indefinitely, despite the tendency of the alternating magnetic flux in the stator-structure to change the same.

In Fig. 5, the motor (257 1/7 R. P. M. at 60-cycles) is provided with a rotor having four equidistant arms providing two pairs of polar-projections having the same characteristics as to polarity and as to relationship to the polar-projections of the stator as has the rotor of the preceding figures.

In Fig. 6 a motor (240 R. P. M. at 60-cycles) is shown provided with a rotor having two pairs of complementary polar-projections A and B respectively. The respective polar-projections of a given one of the said pairs are of permanently-opposite polarity, but it will be noted that instead of a south magnetic polar-projection of one pair being substantially diametrically-opposite a polar-projection of similar polarity in the opposite pair, polar-projections of opposite magnetic polarity are arranged substantially at diametrically-opposite points.

Each of the several motor-structures above described is characterized by a rotor having a plurality of pairs of permanently-magnetized polar-projections, the respective polar-projections of each pair being of opposite magnetic polarity and spaced with respect to each other and with respect to the polar-projections of the stator-structure, so that when a polar-projection of north magnetic polarity is aligned with a polar-projection 16 of the stator-member 15, the complementary polar-projection of south polarity of the said pair will be aligned with a polar-projection of the stator-member 18.

It will be understood, of course, that when an alternating current is flowing in one direction through the coil 22, the polar-projections 16 will at that instant be of south magnetic polarity, while at the same instant the polar-projections 17 of the stator-member 18 will be of north magnetic polarity. Similarly, when the current reverses, the polar-projections 16 will be of north polarity at the same time that the polar-projections 17 are of south polarity—in the usual manner of stator-structures supplied with alternating current.

In each of the sub-synchronous electric motors illustrated, the operative portion of the rotor embraces, so to speak, the polar-projections of the stator-structure. This organization of parts results in a motor-structure having markedly increased torque over and above the torque developed by prior types of motors of equal overall diametrical dimensions, inasmuch as by my arrangement of parts, the tangential forces exerted by the stator-structure are applied to a "moment arm" of greater length than would be the case in a motor of the same diametrical dimension where the rotor is exteriorly encircled by the stator-structure, or arranged to have only its face acted upon by the stator-structure.

My improved sub-synchronous motor in all of its embodiments is characterized by a relatively high degree of torque when running, combined with facility of starting.

It will be understood by those skilled in the art that my invention may assume varied physical forms without departing from my inventive concept, and I, therefore, do not limit my invention to the specific embodiments herein chosen for illustration, but only as indicated in the appended claims.

I claim:

1. A motor comprising in combination two circular field casing sections of magnetizable material, one of said casing sections having lateral marginal projections forming pole pieces, and the other section having polar projections extending radially with respect to the body thereof and interposed between the lateral projections of the other section, a coil for magnetizing said casing sections, a shaft extending axially of said field casing sections and a rotor of magnetic material fixed to said shaft and comprising a shaft engaging portion, an off-set portion lying closely adjacent the laterally disposed ends of the pole pieces on said field casing section having marginal projections, and a portion disposed at an angle to said off-set portion and lying closely adjacent the radially disposed ends of the pole pieces on said field casing section having radial projections.

2. A motor comprising in combination two circular field casing sections of magnetizable material, one of said casing sections having lateral marginal projections forming pole pieces, and the other section having polar projections extending radially with respect to the body thereof and interposed between the lateral projections of the other section, a coil for magnetizing said casing sections, a shaft extending axially of said field casing sections and a rotor of magnetic material fixed to said shaft and comprising a plurality of radially extending arms engaging said shaft, each of said arms having an off-set portion adjacent its outer end lying closely adjacent the laterally disposed ends of the pole pieces on said field casing section having marginal projections, and having a portion disposed at an angle to said off-set portion and lying closely adjacent the radially disposed ends of the pole pieces on said field casing section having radial projections.

3. In an electric motor, in combination, a substantially cylindrical field casing comprising two field casing sections of magnetizable material, each section being provided with a plurality of projections forming pole pieces, the polar projections of one section extending at right angles to and between the polar projections of the other section at the periphery of the field casing, a coil for magnetizing said field casing sections, a shaft extending axially of said field casing and a rotor of magnetic material fixed to said shaft and comprising a shaft-engaging portion, an off-set portion and a portion disposed at right angles to said off-set portion, said off-set portion and said angularly disposed portion lying respectively closely adjacent and across the ends of the angularly disposed polar projections on said field casing sections.

4. In an electric motor, in combination, a substantially cylindrical field casing comprising two field casing sections of magnetizable material, each section being provided with a plurality of projections forming pole pieces, the polar projections of one section extending at right angles to and between the polar projections of the other section at the periphery of the field casing, a coil for magnetizing said field casing sections, a shaft extending axially of said field casing and a rotor of magnetic material fixed to said shaft and comprising a plurality of radially extending arms engaging said shaft, each of said arms terminating in an off-set portion and a portion disposed at right angles to said off-set portion, said off-set portion and said angularly disposed portion lying respectively closely adjacent and across the ends of the angularly disposed projections on said field casing sections.

JAMES R. PUTNAM.